United States Patent [19]

Kemp

[11] 4,149,454
[45] Apr. 17, 1979

[54] COFFEEMAKER BASKET AND FILTER ASSEMBLY

[75] Inventor: Charles L. Kemp, Asheboro, N.C.
[73] Assignee: General Electric Company, New York, N.Y.
[21] Appl. No.: 891,606
[22] Filed: Mar. 30, 1978
[51] Int. Cl.² .............................................. A47J 31/08
[52] U.S. Cl. ........................................ 99/295; 99/306; 210/481
[58] Field of Search ................ 99/283, 295, 296, 304, 99/306, 323, 300; 210/481, 478, 482, 483, 477; 426/432, 433, 434

[56] References Cited

U.S. PATENT DOCUMENTS

| | | | |
|---|---|---|---|
| 719,727 | 2/1903 | Block | 99/299 |
| 2,234,397 | 3/1941 | Bentz | 99/306 |
| 3,086,447 | 4/1963 | Arnett | 99/295 |
| 3,374,897 | 3/1968 | Martin | 99/295 |
| 3,490,356 | 1/1970 | Peterson | 99/295 |
| 3,610,132 | 10/1971 | Martin | 99/295 |
| 3,931,756 | 1/1976 | Brunt | 99/306 |
| 4,069,751 | 1/1978 | Gronwick | 99/306 |
| 4,070,955 | 1/1978 | Braun | 99/296 |

*Primary Examiner*—Robert W. Jenkins
*Attorney, Agent, or Firm*—John F. Cullen; George R. Powers; Leonard J. Platt

[57] ABSTRACT

A drip coffeemaker basket and filter assembly is provided comprising a cup-shaped basket supporting a matching water permeable filter and the basket is generally funnel-shaped with a substantially flat bottom wall of spaced supporting means defining a fixed opening water passage where the supporting means may be spaced radiating ribs. A second adjacent and larger cross-section supporting shelf is spaced above the bottom wall and supports the filter thereon. A convex curved surface connects the shelf and the supporting means whereby the filter seals on the convex surface inversely to the coffee quantity in the filter and automatically varies the effect of filtering area directly with the coffee quantity in the filter providing a single molded unit with non-movable or replaceable parts that automatically adjusts itself for larger and smaller quantities for the correct brew.

6 Claims, 4 Drawing Figures

COFFEEMAKER BASKET AND FILTER ASSEMBLY

BACKGROUND OF THE INVENTION

1. Field of the Invention

The invention pertains to a coffeemaker of the drip type wherein water is heated within a housing and pumped to a spreader to discharge into a supported carafe. The coffeemaker housing may support a basket filter assembly or a separate assembly may be supported directly on the carafe with the hot water dripping through the coffee in the filter to produce brewed coffee in the carafe. The present invention is directed to an improved basket and filter assembly of a single piece that automatically adjusts itself to produce the correct brew for large or smaller amounts of coffee.

2. Description of the Prior Art

In electric drip coffeemakers, there is provided a basket and filter assembly that performs efficiently at maximum capacity. At low levels, more coffee is used per cup to obtain the same strength of coffee due to inefficient extraction. Various multi-part and complex devices have been developed to overcome this inefficiency. Typically, one device reduces the cross-section area of the basket by squeezing a given amount of coffee into a smaller cross-section and higher pile to provide a longer path for the water to drip through a given amount of coffee to obtain the same brew strength at smaller quantities. Because of the complexity of the device, it is expensive to produce and has only marginal benefits. Other arrangements may use a special smaller basket to be inserted in the main basket to hold a smaller amount of coffee when few cups are desired. While effective, this requires an additional piece of equipment with manufacturing costs and storage problems.

It is desired to provide a basket and filter assembly that automatically provides the correct brew for small and large quantities of coffee for two reasons. First, with coffee costs high it is incumbent that the correct amount of coffee and no more be used. Second, it is preferable that no additional components be required because of their extra cost and storage problems on the part of both the manufacturer and the user. The present invention is directed to such a device in a basket filter assembly that efficiently extracts a desired amount of coffee from the coffee grounds without any parts other than a unique basket and standard paper filter.

SUMMARY OF THE INVENTION

In accordance with the invention, a drip coffeemaker basket and filter assembly comprises a cylindrical cup-shaped basket having funnel slanting side walls and upper and lower spaced concentric flat bottom of different cross-sections with the lower bottom having a fixed opening water passage through spaced supporting means therein that may be spaced radiating ribs. The upper bottom includes a spaced annular shelf around and opening into the lower bottom. A water permeable filter is disposed in and fills the basket in the conventional manner and is supported on the annular shelf. For automatic adjustment, a convex curved reducing funnel surface connects the shelf and lower bottom whereby the filter seals on the convex surface inversely to the quantity of coffee in the filter and automatically varies the effective filtering area directly with the coffee quantity in the filter. The entire assembly, by its unique construction, is a single shaped basket with a standard paper filter that automatically adjusts itself to the amount of coffee used. Thus, the main object is to provide a convenient coffee saving feature without adding any parts to the coffeemaker or conventional basket/filter assembly while making it automatically adjustable to different quantities of coffee and supplying the correct brew.

DESCRIPTION OF THE PREFERRED EMBODIMENT

Figure 1:
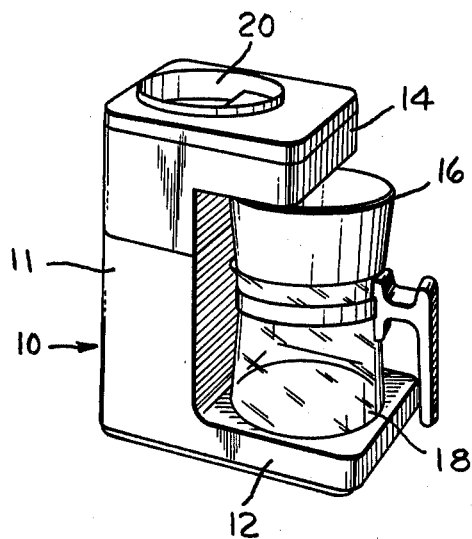
FIG. 1 is a perspective of a drip coffeemaker that may use the invention.

Referring to FIG. 1, there is shown a typical plastic coffeemaker of the smaller or four-cup variety that is generally appropriate to the invention herein although the invention is not so limited. Additionally, the basket/filter assembly may be designed to be supported directly on the coffeemaker as in U.S. Pat. No. 4,013,199 of common assignment or, as shown, in a typical plastic coffeemaker of the smaller or four-cup variety it may be supported directly on the carafe. The coffeemaker includes a molded plastic housing of a generally C-shape with a lower horizontal leg 12 forming a heated carafe support and an upper horizontal leg 14 containing a water spreader to feed heated water into a coffee containing basket 16 supported on a carafe 18 in a conventional fashion. The third portion or vertical leg 11 of the housing encloses a water reservoir in the upper portion thereof which reservoir is accessible by removable lid 20 through which cold water is poured into the reservoir to start the coffeemaking operation when the unit is energized. Coffee is brewed in accordance with the invention, by dripping hot water through basket 16, which as viewed in FIG. 3, contains a standard water permeable filter 24 of any well known type holding coffee in the quantity desired for the number of cups being brewed. Water passes through the coffee and into lower carafe 18 as brewed coffee. This is all standard structure well known in the art.

Most drip coffeemakers have a filter and basket system that performs efficiently at maximum capacity, at lower level capacity, more coffee is used per cup to obtain the same strength of coffee due to inefficient extraction. As previously noted, complicated devices such as adjustable inner cups or separate smaller cups may be nested to hold a smaller amount of coffee but these are more expensive to produce, add more complexity, and have only marginal benefits. In a small coffeemaker that is used to brew one to four cups, the basket and filter system presents problems due to the range of coffee that must be used as, for example, six to thirty six grams. Systems that work well with thirty six grams or full four cup capacity are inefficient at the six gram or single cup level and systems that are efficient at the six gram level would overflow at the thirty six gram level. In other words, the opening for the water to pass through into the carafe is smaller for six grams of coffee for efficient extraction and the opening is much too small for thirty six grams of coffee so the water backs up and would overflow the basket. The system of the invention efficiently extracts the desired amount of coffee from the coffee grounds without any parts other than a unique basket and a standard paper filter.

Figure 2:
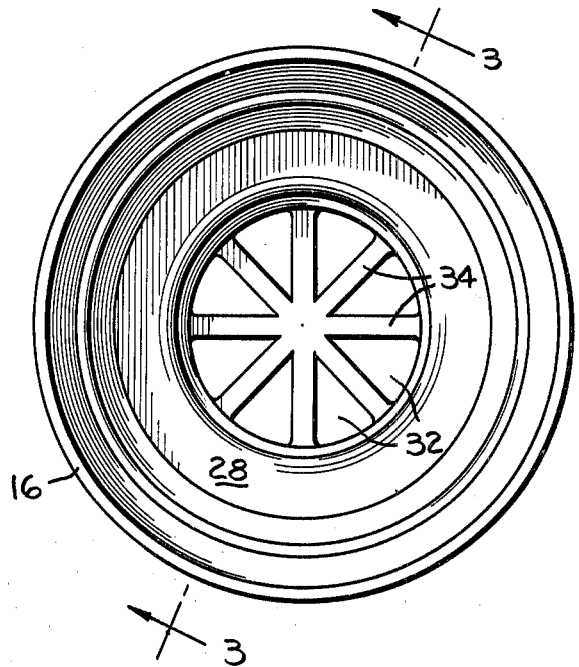
FIG. 2 is a plan view of the coffeemaker basket.
Figure 3:
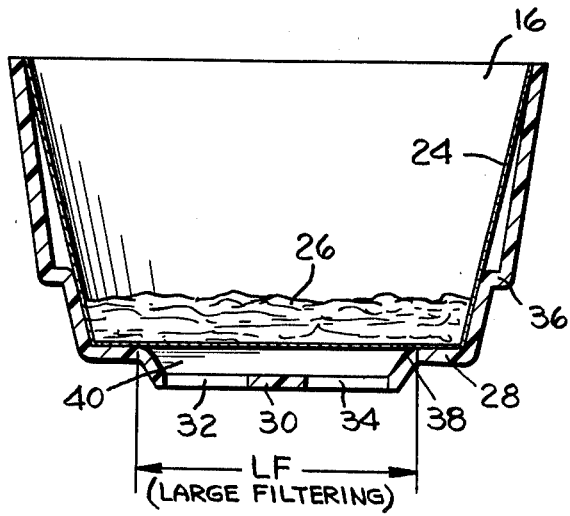
FIG. 3 is a cross-sectional view on line 3—3 of FIG. 2 showing a large quantity of coffee and, FIG. 4 is a view similar to FIG. 3 with a smaller quantity of coffee.

To this end, there is provided a basket and filter assembly as seen in FIGS. 2 and 3, that comprises a cylindrical cup-shaped basket 16 that has standard funnel shaped slanting side walls as seen in FIG. 3. In accordance with the invention, it is provided with upper flat bottom wall 28 and lower flat bottom wall 30 that are vertically spaced from one another and are concentric and of different cross-sections with the upper wall larger in cross-section than the bottom wall. For passage of water into the carafe, lower wall 30 is provided with a fixed opening water passage 32 between spaced radial supporting ribs 34 as seen in FIG. 2. For supporting the standard matching cone-shaped paper filter 24 in cup shaped basket 16, the upper bottom wall 28 is formed as an annular shelf concentric with and completely around and opening into the lower bottom wall 30 as seen in FIG. 3. The basket 16 is supported in the carafe by an enlarged portion such as annular lip 36 as a convenient support and forming no part of the invention. As seen in FIG. 3, the water permeable filter 24 thus completely fills the basket 16 and rests or is supported on the annular shelf formed by the upper bottom wall 28. Heretofore, the filter has been supported directly on the bottom of the basket rather than on an annular shelf surrounding it as shown. In the usual case, the bottom wall has been slanted or coned down to a central opening through which the water or brewed coffee filters into the carafe.

To avoid additional structure and provide automatic efficient extraction, the basket and filter assembly herein employs the spaced shelf upper wall 28 and lower wall 30 and, for automatic adjustment, these walls are connected by a convex curved reducing funnel surface 38 which is nothing more than a smooth faired surface connecting shelf 28 and bottom wall 30 as clearly shown in FIG. 3. The particular curvature employed depends on the capacity of the coffeemaker i.e. one to four cup as illustrated.

Figure 4:
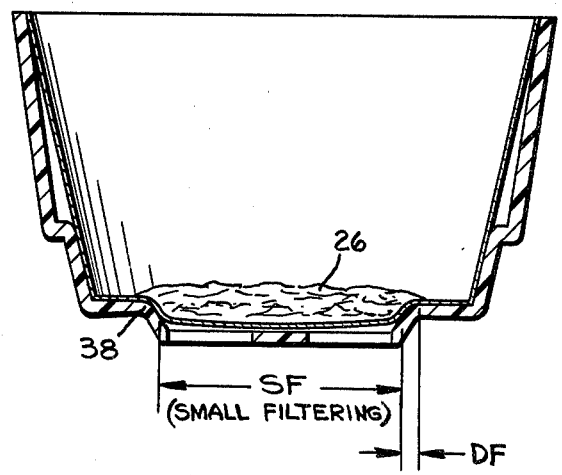

For efficient brewing of coffee, it is necessary to change the effective filtering area of the paper filter and, with the construction shown, this is automatic and is determined by the amount of coffee used and the shape of the curved surface 38 connecting shelf 28 and lower wall 30 formed by equally spaced radiating ribs 34 that run from the center of the opening to support the filter and coffee therein if they sag as shown in FIG. 4.

In operation, when small quantities of coffee are used, the filter and coffee sag into the lower area 40 as shown in FIG. 4. The filter, being wet, conforms to the convex surface 38 sealing itself thereto to reduce the effective filtering area to a small filtering area indicated as SF permitting water flow only through the SF area of the filter. This reduction in filter area reduces water flow and allows water to completely cover the small quantity of coffee grounds 26 as shown in FIG. 4. This complete saturation of the grounds permits more complete and efficient extraction of coffee from the grounds. Thus, it will be seen that the filter seals on a larger area of convex surface 38 with a smaller amount of coffee 26 or, its sealing effect is inversely proportional to the quantity of coffee in the filter. At the same time, the actual effective filtering area SF is reduced or varies directly with the small quantity of coffee in the filter.

For larger quantities of coffee, as shown in FIG. 3, the same structure has different and reverse effect. The larger quantity of coffee 26 in the basket is more evenly distributed over the entire horizontal surface or the entire shelf 28 to provide more filter support thus preventing the filter from sagging and sealing along surface 38 as shown in FIG. 3. This allows a larger effective filtering area LF since water is able to flow from the surface of tangency of the filter with convex surface 38 and the larger effective filtering area LF is obtained to increase water flow but still allow complete saturation and the desired extraction of the coffee from the grounds. In effect then, when larger quantities of coffee 26 are used as in FIG. 3, the sealing of the filter on convex surface 38 is less or actually none at all as the coffee quantity is increased. Thus, the sealing is inversely proportional to the coffee quantity in the filter. At the same time the large filtering area LF is increased or varies directly with the larger quantity of coffee in the filter. The difference in the filtering area DF is thus represented by an annular area DF on the sealing surfce 38 as shown in FIG. 4.

Since the water flow rate is determined automatically by the single molded basket configuration and amount of coffee used, the user, by putting in the required amount of coffee in a standard filter for the cups desired, automatically recieves the correct brew. Thus, no additional parts or components are required to achieve the convenient coffee saving feature while obtaining complete saturation for efficient extraction of coffee from the grounds automatically under varying conditions.

While I have hereinbefore shown a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. A drip coffeemaker basket and filter assembly comprising,
 a cup-shaped basket supporting a matching water permeable filter,
  said basket being generally funnel-shaped with a substantially flat bottom wall of spaced supporting means defining a fixed opening water passage,
  a second adjacent and larger cross section supporting shelf spaced above the bottom wall and supporting said filter thereon, and
  a convex curved surface connecting said shelf and supporting means
 whereby the filter seals on said surface inversely to, and automatically varies the effective filtering area directly with, the coffee quantity in the filter.

2. Apparatus as described in claim 1 wherein the spaced supporting means comprises ribs radiating from the center of said flat bottom, the water flowing between said ribs.

3. Apparatus as described in claim 2 wherein said basket is a single integral molded plastic member.

4. A drip coffeemaker basket and filter assembly comprising,
 a cylindrical cup-shaped basket having funnel slanting side walls and upper and lower spaced concentric flat bottoms of different cross sections,
  the lower bottom having a fixed opening water passage through spaced supporting means therein, the upper bottom including a spaced annular shelf around and opening into the lower bottom, a water permeable filter filling said basket and supported on said annular shelf, and a convex curved reducing funnel surface connecting said upper and lower bottoms whereby the filter seals on said surface inversely to, and automatically varies the effective filtering area directly with, the coffee quantity in the filter.

5. Apparatus as described in claim 4 wherein the spaced supporting means in said fixed opening comprises equally spaced ribs radiating from the center of the lower bottom, the water flowing between said ribs.

6. Apparatus as described in claim 5 wherein said basket is a single integral molded plastic member.

* * * * *